(12) United States Patent
Calissendorff

(10) Patent No.: US 9,088,812 B2
(45) Date of Patent: Jul. 21, 2015

(54) CONTEXT AWARE DYNAMIC INTERFACE

(75) Inventor: Erik Calissendorff, Gothenburg (SE)

(73) Assignee: Plejd AB, Gothenburg (SE)

( * ) Notice: Subject to any disclaimer, the term of this patent is extended or adjusted under 35 U.S.C. 154(b) by 565 days.

(21) Appl. No.: 13/000,935

(22) PCT Filed: Jun. 4, 2009

(86) PCT No.: PCT/SE2009/050669
§ 371 (c)(1),
(2), (4) Date: Feb. 10, 2011

(87) PCT Pub. No.: WO2010/005366
PCT Pub. Date: Jan. 14, 2010

(65) Prior Publication Data
US 2011/0131506 A1 Jun. 2, 2011

Related U.S. Application Data

(60) Provisional application No. 61/078,398, filed on Jul. 6, 2008.

(51) Int. Cl.
G06F 3/00 (2006.01)
(Continued)

(52) U.S. Cl.
CPC ........ *H04N 21/25875* (2013.01); *G06F 3/0482* (2013.01); *G06F 9/4443* (2013.01); *H04N 5/765* (2013.01); *H04N 21/43615* (2013.01); *H04N 21/44227* (2013.01); *H04N 21/462* (2013.01); *H04N 21/482* (2013.01); *H04N 5/775* (2013.01)

(58) Field of Classification Search
CPC ....... H04W 4/02; H04W 64/00; H04W 4/008; H04W 16/32; H04W 52/0238; G06Q 30/0261; G06Q 10/08; G06F 3/0416; G01S 5/0027; G01S 13/003; G01S 5/02; G01S 5/06; H04B 1/1027; H04B 1/109; H04L 2025/03477; H04L 2025/0377; H04L 25/03066; H04L 25/03133
See application file for complete search history.

(56) References Cited

U.S. PATENT DOCUMENTS 7,149,747 B1 12/2006 Cheng et al.
2004/0183829 A1* 9/2004 Kontny et al. ................ 345/751
(Continued)

FOREIGN PATENT DOCUMENTS

EP 1460538 1/2004

*Primary Examiner* — Boris Pesin
*Assistant Examiner* — Ayesha Huertas Torres
(74) *Attorney, Agent, or Firm* — Babcock IP, PLLC

(57) ABSTRACT

A method performed in a transmitter operable to provide multiple functions, comprising identifying available functions, receiving input relating to a current user context, based on said context, selecting a subset of functions from said available functions, and dynamically generating said user interface, said user interface arranged to present user activatable items representing each of the functions in said subset, and, upon activation of one of said items, performing a function associated with said item in accordance with said user context. A system with a transmitter adapted to perform the method. The disclosed method and system creates a fully dynamic user interface where the context and user should be able to define what should be available where in the interface without additional programming.

9 Claims, 17 Drawing Sheets

(51) Int. Cl.
*H04N 21/258* (2011.01)
*G06F 3/0482* (2013.01)
*G06F 9/44* (2006.01)
*H04N 5/765* (2006.01)
*H04N 21/436* (2011.01)
*H04N 21/442* (2011.01)
*H04N 21/462* (2011.01)
*H04N 21/482* (2011.01)
*H04N 5/775* (2006.01)

(56) References Cited

U.S. PATENT DOCUMENTS

2006/0284766 A1* 12/2006 Gruchala et al. ......... 342/357.09
2007/0064477 A1* 3/2007 Dorow et al. ............ 365/185.01
2007/0282869 A1 12/2007 Paulus et al.
2008/0010244 A1 1/2008 Cheng et al.
2009/0150938 A1* 6/2009 Clancy ........................... 725/47

* cited by examiner

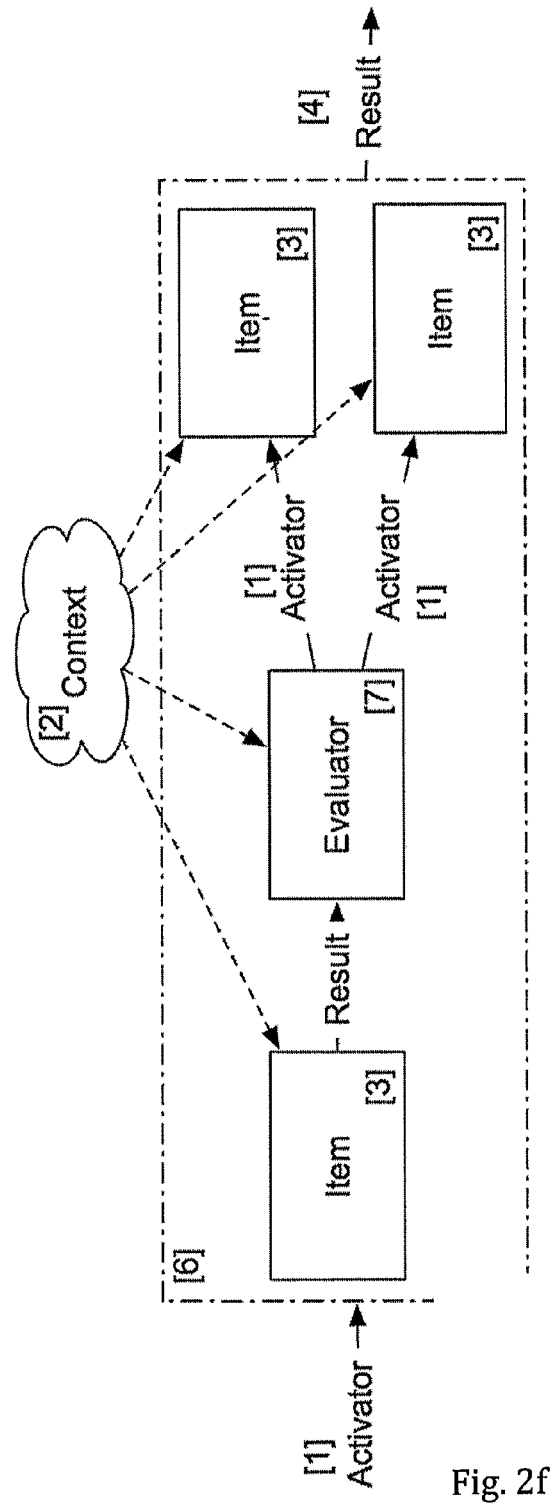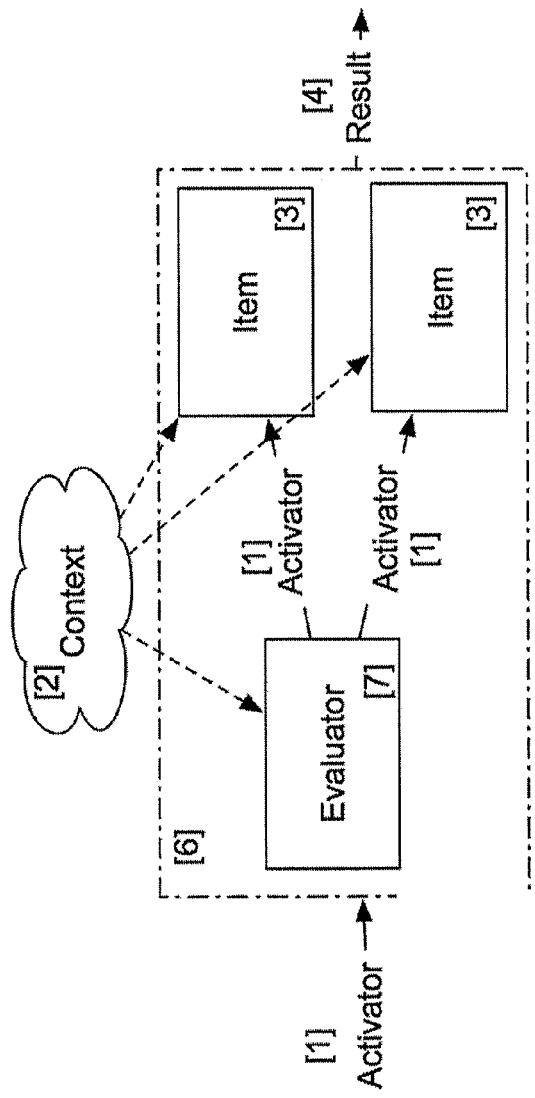
Fig. 2f
Fig. 2g

CONTEXT AWARE DYNAMIC INTERFACE

TECHNICAL FIELD

This invention relates generally to dynamically create the interface for representation of control commands, information and services, and more particular how the interface can remain consistent as the context is changing.

BACKGROUND

Recently, connecting two or more entities in a network could imply a lot of configuration to ensure a functioning communication. To solve this problem methods to seamlessly create automatic configuration was created an example of these methods is plug and play but other solutions also exists. Plug and play started to gain momentum with Universal Serial Bus or Port (USB) on personal computers and have evolved into many applications during the last years. Nowadays more advanced standards exists that can be used for almost any type of devices; an example of such a protocol is Universal Plug and Play (uPnP).

Plug and play removes much of the configuration when installing or replacing devices. In cases where a device, for example a video player, is installed or removed the devices in the connection exchange their functionality with each other. With plug and play functionality there is no or limited need to manually specify what type of equipment that is installed or removed.

Plug and play has made installation and maintenance of communicating devices much easier. However it has not affected the user experience in the same way nor dramatically changed how the user interacts with the devices. While the technology for the communication between equipment, such as video players, has been widely developed, the methods to enable a dynamic user interface has been lacking. In particular user interfaces that adapts to the surrounding context in terms of functions that has not previously been specified and enable the statuses to be shown in real time has been lacking.

Today, most devices with a user interface for sending and receiving commands, hereafter referred to as transmitters, have their own type of user interface and methods for interaction. This requires the user to learn multiple interfaces in order to utilize different transmitters and their functions. As a function of the differences between transmitters interfaces, the interchange of information with transmitters has been limited to special predefined set of functions.

Document WO06029391 discloses a master controller which the user interface is connected to.

Document WO27075816 discloses a system that requires compilation before enabling the new functions.

Document US2009313566 discloses how a menu structure can be collected from a remote location.

SUMMARY

Disclosed is a method, which allows the user to incorporate functions normally found in multiple different transmitters into a single interface without extensive training or configuration. The disclosed method is not limited to combine functions from typical transmitters but can be used to incorporate consistent presentation for other usages as well. These include but are not limited to any or all of the examples that are listed here:
Services, for example instant messaging
Information, for example TV Guides weather and stock details
Equipment control, for example play and pause of different equipment Today, dynamic user interfaces changes between predefined alternatives. When for example a predefined graphical interface is not applicable, it becomes hidden or unavailable to the user. The setting of the interfaces between the device and the user are predefined and the alternative for the interface was identified when the interface was created. If new alternatives and functions are desired the user interface has to be reconfigured or even replaced by a human effort.

What is proposed with the disclosed method is a way to create a fully dynamic user interface where the context and user should be able to define what should be available where in the interface without additional programming.

DETAILED DESCRIPTION

The disclosed method consists of different parts, including but neither requiring nor limited to, transmitter, presentation model, controller and controlled equipment. The different parts can be located together or separated physically and in terms of logical attributes. Each described part can exist in multiple unique instances and at different location but is not required to. The parts can, but is not limited to, communicate with each other through direct procedure calls, over the network or by any other means. A network can, but is not required to, be used when the transmitter and controller do not know of each other already or when the information is indented to multiple controllers or user controls. Example of networks communication includes, but is not limited to, local networks and the Internet. Broadcasts, multicast, and dedicated messages as well as proxies or other means of relaying messages can be used, but the network communication is not limited to the given examples.

Transmitter

The transmitter is the user interface where the user interacts with available content; the transmitter can but is not required to use the presentation model to present the available content and interpret the user's action so they can be used by the system.

Controller

A system can consist of one, many or no controllers. Each controller can, but is not required to handle one or multiple different types and instances of equipment. Each controller is responsible for informing available transmitters of which commands that it has available and the status of these commands when they change.

Equipments

The method can be used to control, but is not limited to, any kind of electronically connected equipment, including, but not limited to, curtains, TV, DVD, lights, cameras, radio, heat ventilation and air condition (HVAC), music player and movie player.

Each controller has to know how to interact with the equipments that it should control and have the needed connection with the device. The connection could for instance be, but is not limited to, IR, serial data interface, network and another program on the physical unit or on another location.

Context

Figure 1:
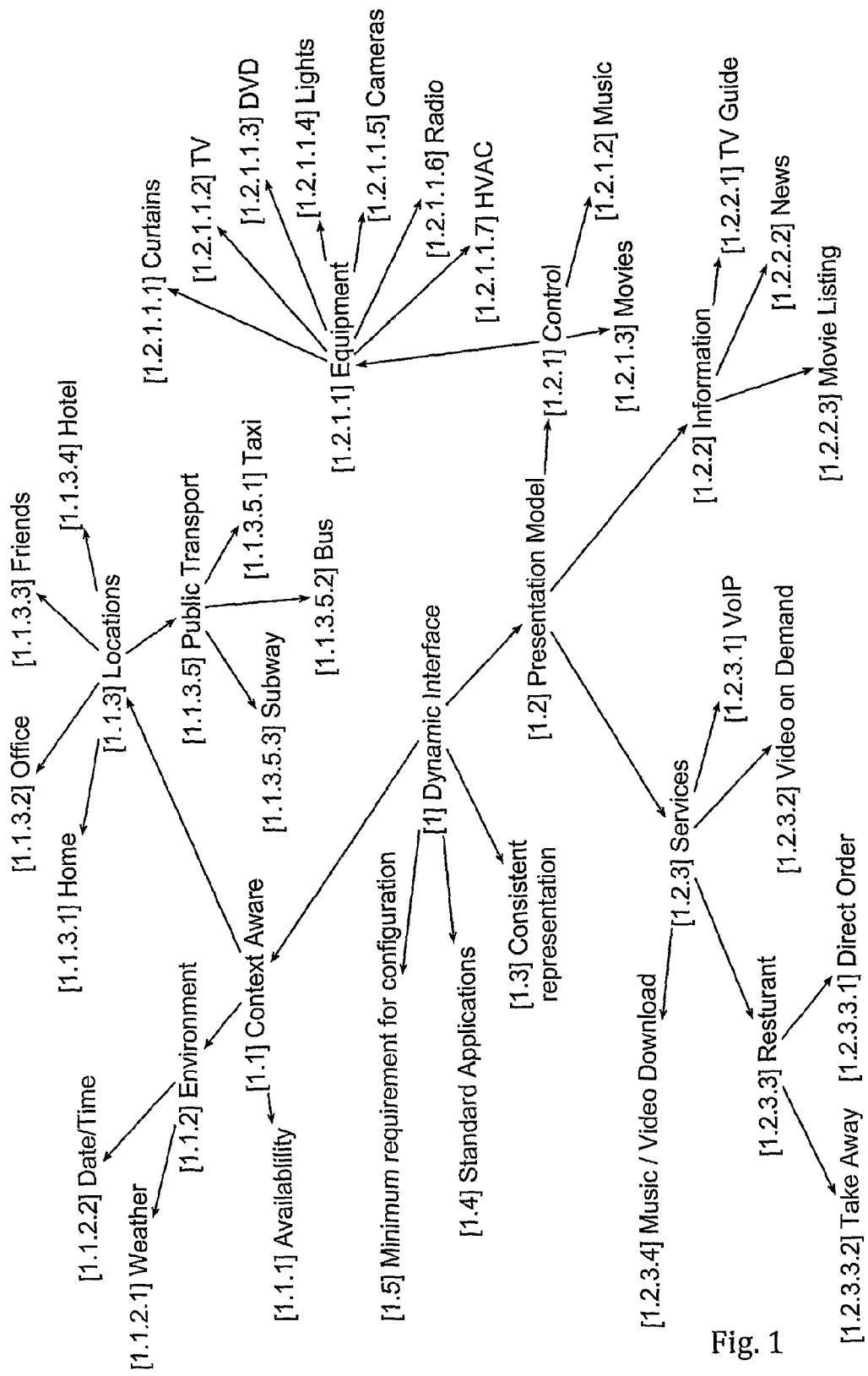
FIG. 1 shows the different areas that together can, but is not required to, compromise the dynamic interface.

With reference to FIG. 1, the context that the transmitter is applied to can, but is not required to, determine how the transmitter will look and what it can be used for, indicated as context aware 1.1. Examples of contexts that can be used to determine the representation of the transmitter comprise, but are not limited to, availability 1.1.1, the environment 1.1.2 and location 1.1.3. Including, but not limited to, the devices, their commands and known services that can be interacted with 1.1.1 will be part of the available content. To determine the available content existing and future protocols for, but not limited to, plug and play and device discovery can be used. To determine the availability the method will both be able to detect new devices at any time as well as when devices becomes unavailable. To get a better context for, but not limited to, the usage of existing equipment and services the environment 1.1.2 will be a parameter that can, but is not limited to, limit or enhance how to display for example the available equipment/services. The location or movement of the user and/or the transmitter or other device can be used to determine which functions that should be available at different locations 1.1.3. An example is that even if the commands for a TV are accessible from a remote location the allowed commands could be limited from different locations.

Presentation Model

The presentation model 1.2 will identify controllers and maintain a current representation of which items that a user can perform at any instance in time. The presentation model ensures that each item can be presented and that the user preferences are adhered to. The presentation model can also, but is not required to, handle the interaction with the transmitter.

To know all the functions that are available is not sufficient to create a usable dynamic interface; the functions have to be able to be described in a way that can be interpreted by the transmitter to dynamically create the representation. The presentation model 1.2 can be used to, but is not limited to, describe functions such as, controls 1.2.1, information 1.2.2 and services 1.2.3 in a way so it can be presented according to the users preferences. Representation of functions that control equipment or functions that can provide content to equipment such as music and movie servers, each equipment typically contains multiple functions and these can, but is not required to, be grouped together in one or multiple groups. The user can, but is not required to be able to, modify the groups to for example combine different equipment or remove functions that are not used. The presentation model shall also handle to display information, while control functions controls something information functions present information, this can include, but is not limited to, TV guide, latest news, weather forecast and other information. The presentation model could also among other things provide two-way communication with remote services to enable functions such as telephony, payment of content and orders. The presentation model includes the information that is needed to dynamically generate the interface depending on the context. Since all elements are described using a common model the presentation model can combine information from different sources while maintaining a consistent representation 1.3. By ensuring that the representation is consistent the user will feel familiar even when the functions changes and new functions become available. To ensure a consistent representation for any kind of usage the presentation model should, but is not required to, also support rich interface elements, such as web browsing, video playback and even embedded applications, for example Microsoft Word and Excel 1.4.

The transmitter should provide the right information and adhere to the users requirements. Depending on the users preferences some degree of configuration could be desired. Still, all configuration of the user interface should be able to be perform by the user himself without prior programming knowledge 1.5.

Figure 2A:
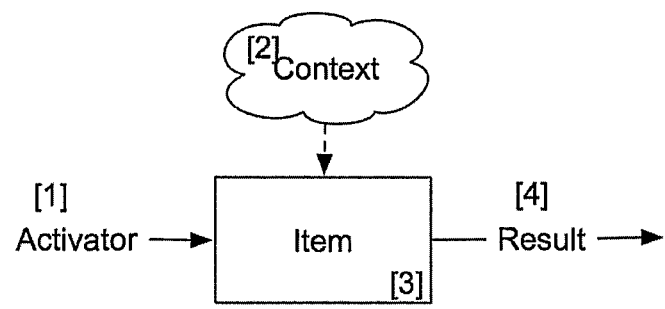
FIG. 2 contains information about how commands can, but is not limited to, be activated.

Turning to FIG. 2a, the transmitter can, but is not limited to, be created around items 3. An item is an entity that can, but is not required to, be presented by the transmitter. An item can be, but is not limited to, the following:

A Command 17 is an item that performs an operation that is not required to be part of the user interface.

Presentation of some sort of information.

Sequence groups 6 contain two or more items that are depending on each other in at least one specified sequence.

Presentation groups 9 are a collection of items described further down.

Application items 12 encapsulates applications so they appear as an item, more details further down.

Item Descriptions

Each item 3 has a description to describe the details of the item. The description can contain, but is not limited to, what is needed to activate the item, what action does the item performs, what type of results is expected and how can it be represented.

Item Activation

To activate an item 3 the affected item is specified together with any potential extra information that the item can handle. The information that is used to activate an item is hereafter referred to as activators 1. The potential extra information of an activator could, but is not limited to, containing either user actions, specific context or a combination of both. When activated the item can, but is not required to, inspect the current context 2 to determine what it should do, the item can thereafter, but is not limited to, returning the result 4. The result could include, but is not limited to, the status of the item, the status can contain for example if the item was a success or failure, the result could also include, but is not limited to, additional data such as the context that it was used in and resulting data.

Figure 2B:
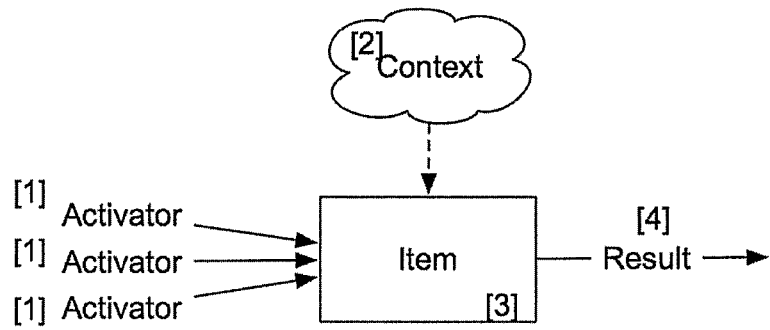
Figure 2C:
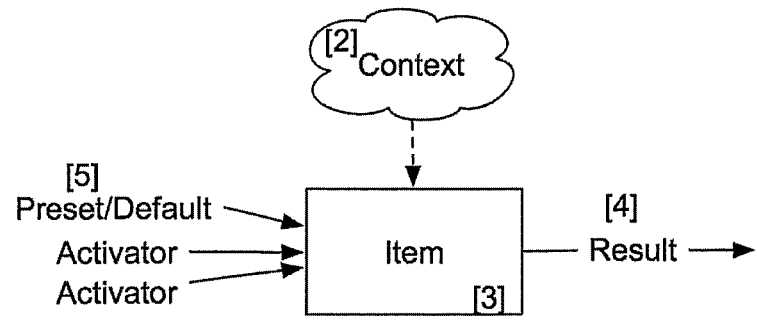

With reference to FIG. 2b, multiple activators 1 can be used for example to enable multiple ways of interaction. With reference to FIG. 2c, Preset and/or default values 5 can, but is not required to, be used. When preset and/or default values are used they can enable items even if different activators might not contain the required context for an item. The activator can, but is not required to, override the default values to enable a more specific usage.

Item Linking

Figure 2D:
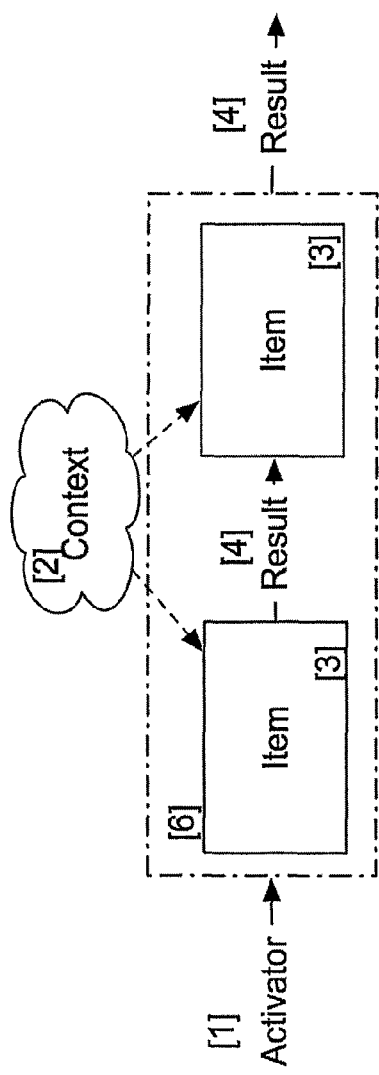

With reference to FIG. 2d, the result from a command has the same structure as the activator and can therefore be used to link command together 6 to be activated in sequence.

Figure 2E:
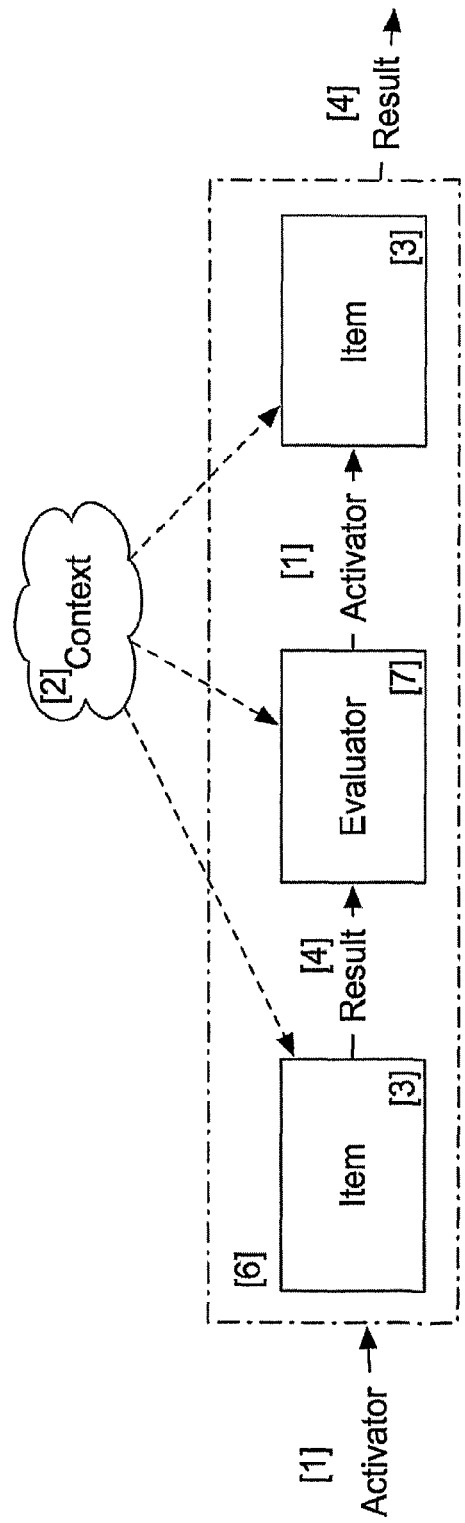

With reference to FIG. 2e, if the result of one command does not correspond with a supported activator for a command an evaluator 7 can for example be used. An evaluator can transform a result into a supported activator for the linked command. With reference to FIG. 2f, evaluators 7 can also be used to issue different commands depending on the result given.

With reference to FIG. 2g, an evaluator 7 can be activated directly by an activator since the activator and the result has a similar structure. The evaluator can then issue different commands depending on how it is activated.

Presentation Groups

Figure 3A:
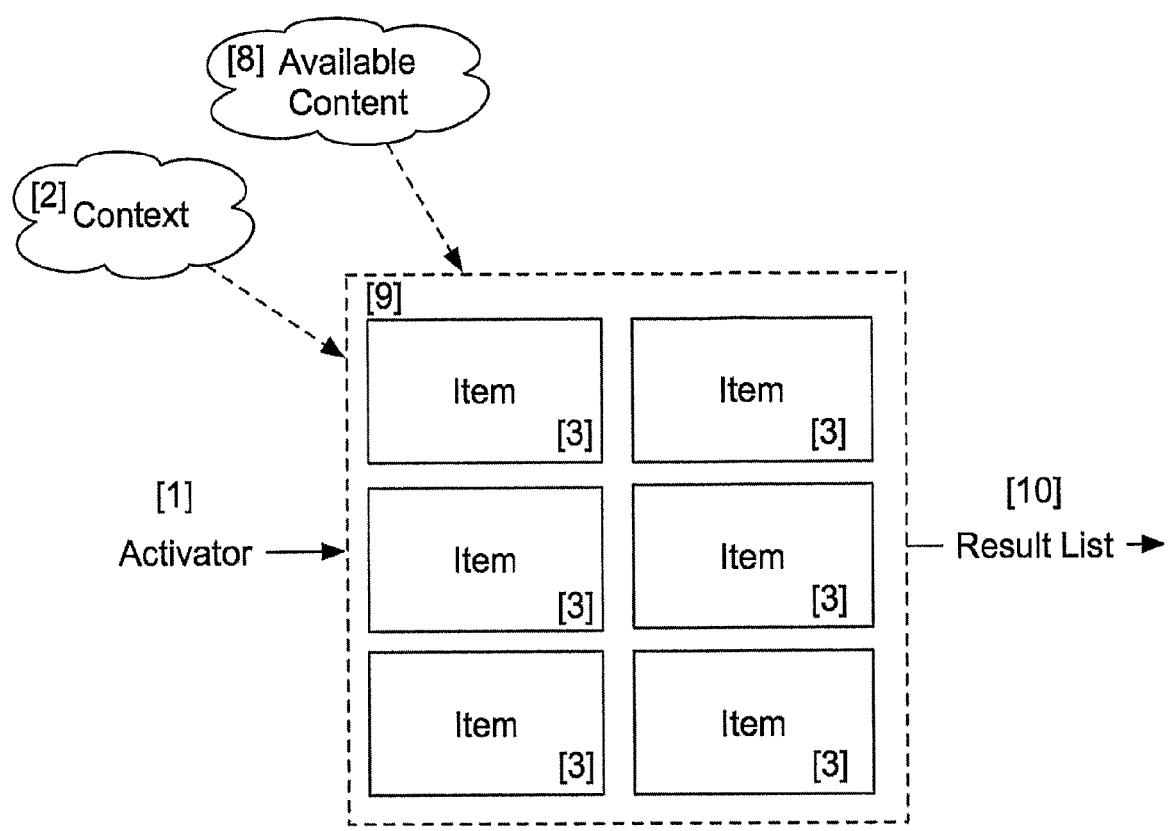
FIG. 3 shows examples of how multiple commands can, but is not limited to, be grouped in different ways depending on how they should be used.

With reference to FIG. 3a, presentation groups 9 enable the context 2 to change while maintaining a consistent representation of the interface. A presentation group 9 can contain multiple items that can be specified in different ways, below is a list of some of the ways that a presentation group can, but is not limited to, be adjusted to changes in, but not limited to, the available content 8 or context 2.

- The group will contain specific items or groups of items if available.
- To content is determined by which available items that fulfills the criteria. A criterion could be, but is not limited to, the type or location in a hierarchy that the item is located at or a supporting context.
- The contained items are depending by some other method, this could be, but is not limited to the most recently used items.

Figure 3B:
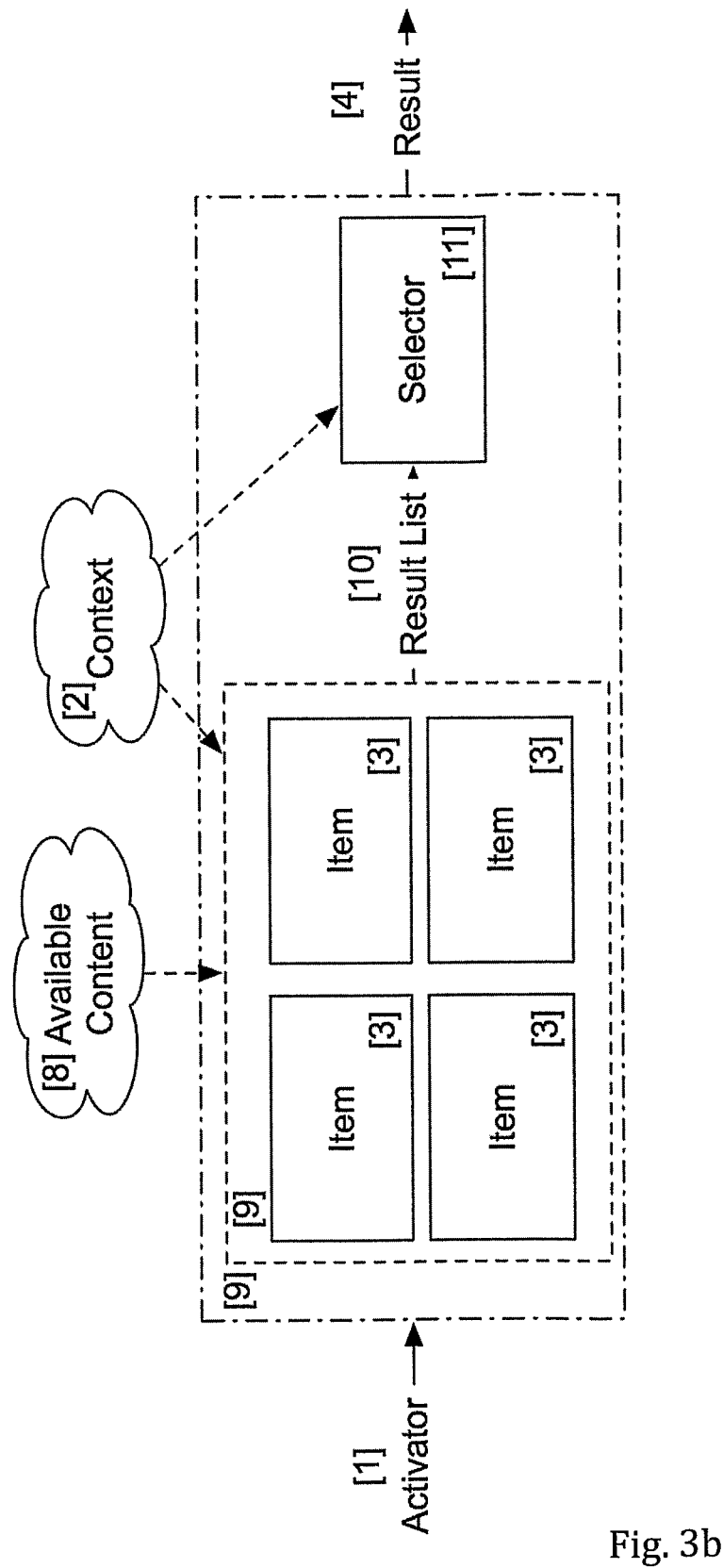
Figure 3C:
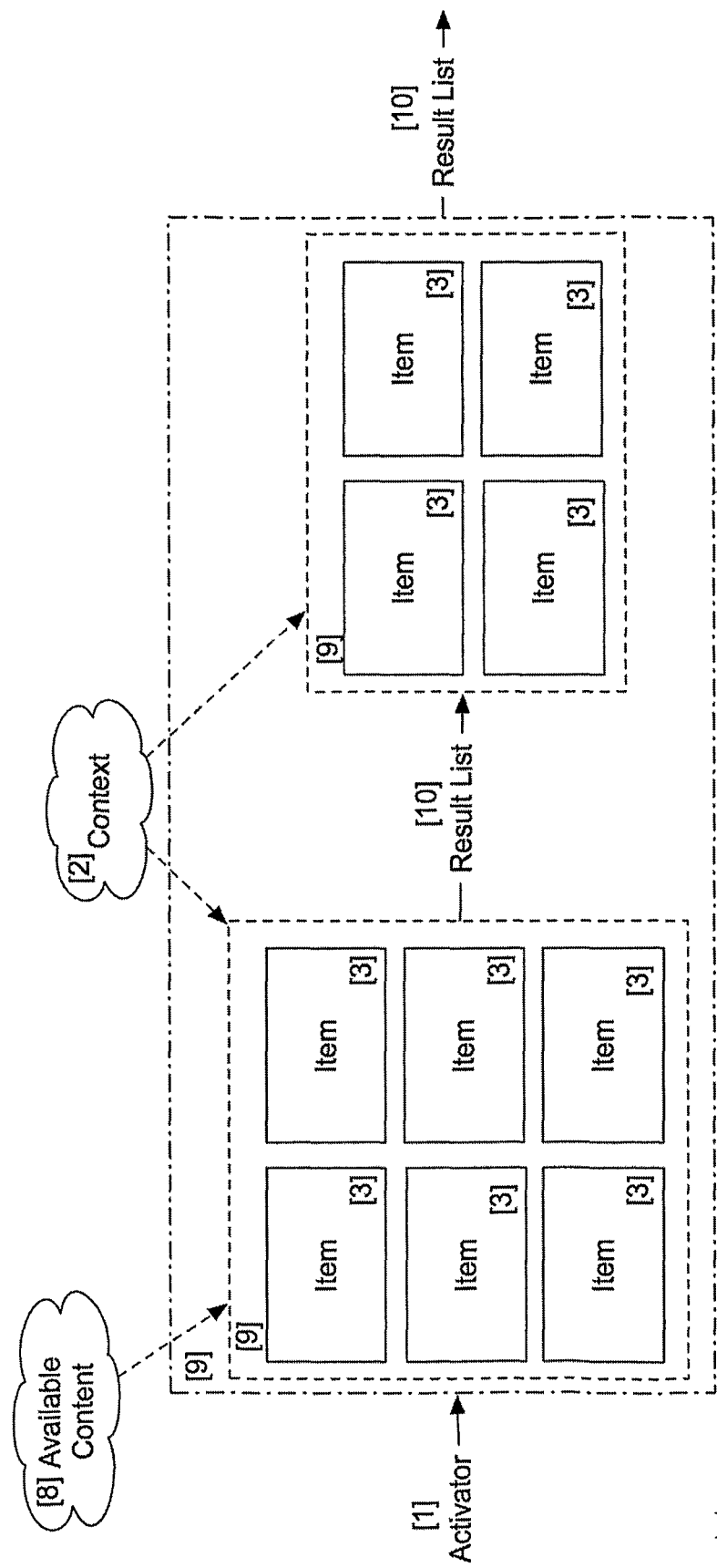
Figure 3D:
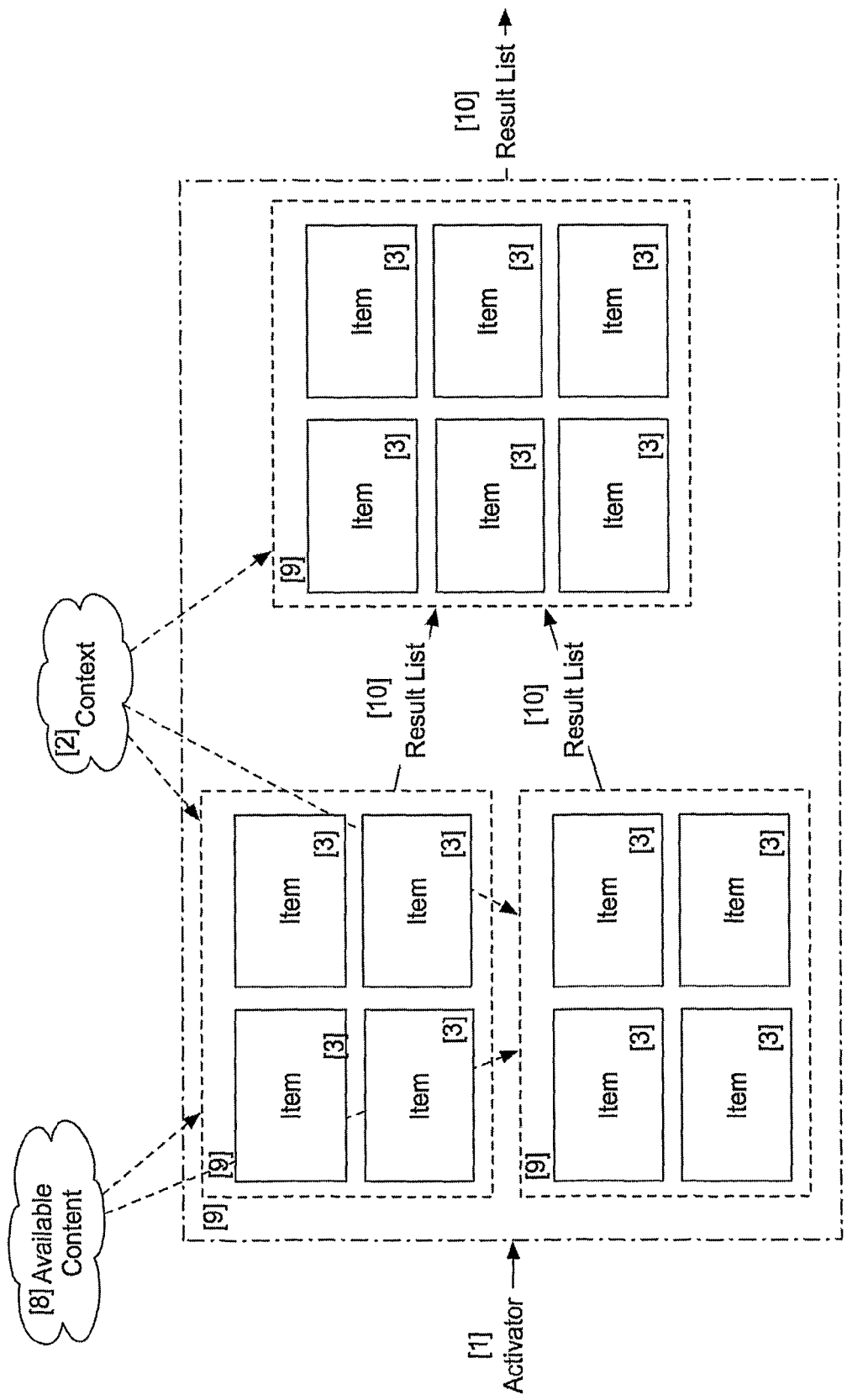

With reference to FIGS. 3c and 3d, presentation groups 9 return a list of items that can, but is not limited to, be displayed or used as input to items. By default, groups examine all available content 8, but if the resulting list 10 of a presentation group 9 is given as input to another presentation group 9 the resulting list from the previous group will be used when determining which items that match the groups settings instead of using all available content.

Selectors

With reference to FIG. 3b, to avoid the user having to handle individual items in presentation groups a selector 11 can be used. The selector 11 can for example, but is not limited to, let the most suitable, all or a selection of the available items to be activated simultaneously, or in some kind of sequence.

A few examples of how the selectors can be used:
A selector that issues all the commands can be used to turn off all the lights with a single command.
When turning on the TV a selector might be used to determine the preferred channel depending on the TV guide and previously watched shows.

Application Items

Figure 4:
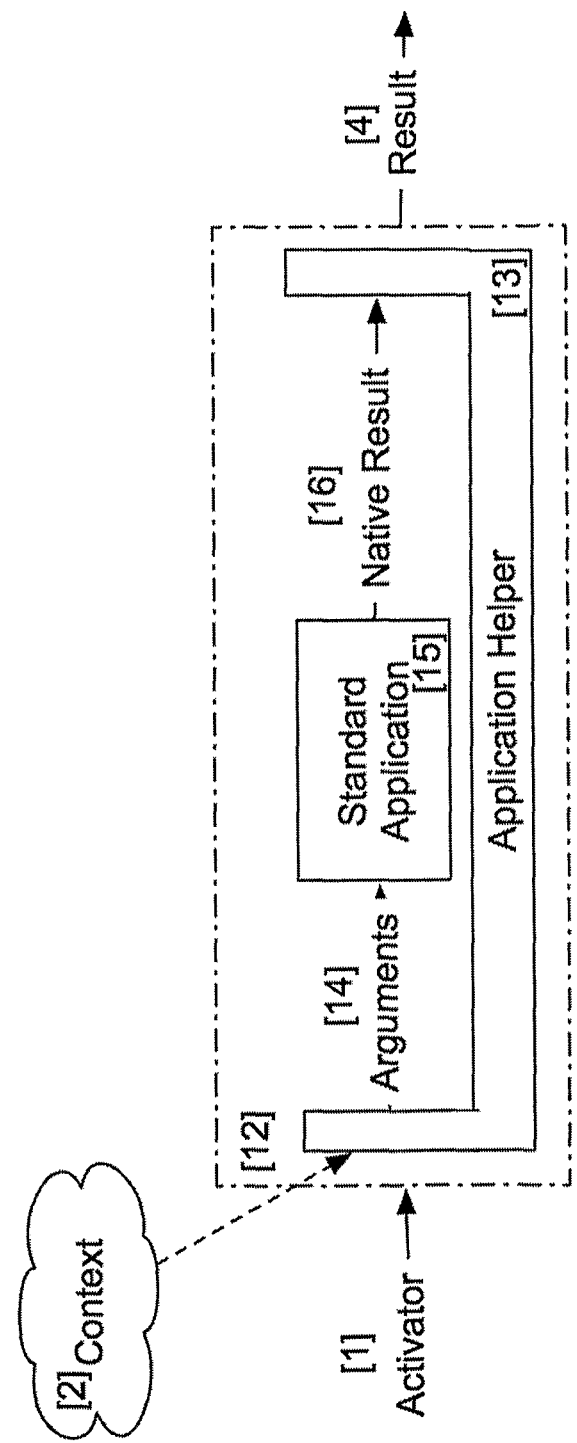
FIG. 4 shows an example of how standard applications can, but is not limited to, be embedded to appear as a command.
Figure 5A:
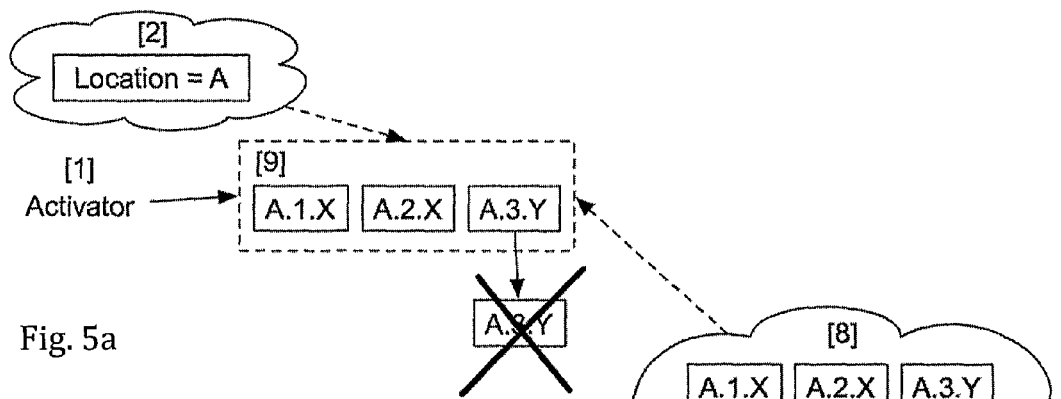
FIG. 5 shows an example of how a user can, but is not limited to, modify the representation and how that modification can be adhered to even when the surrounding context changes.
Figure 5B:
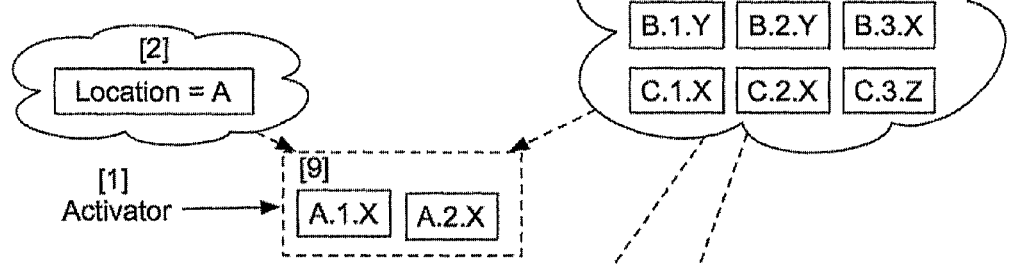
Figure 5C:
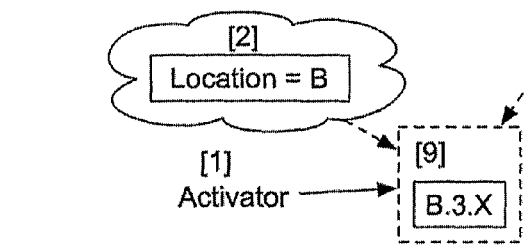
Figure 5D:
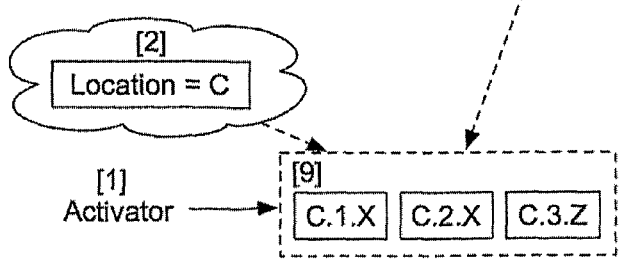

With reference to FIG. 4, application items 12 are containers that enable standard software applications 15 to appear as standard items 3. An application helper 13 provides the needed arguments to start the application in correspondence with the activator and context 14, it also translate the result from the standard application 16 into the same format as other items so it can for example be used to link application items together with other items if desired.

Depending on how the application helper 13 is setup it could, but is not limited nor required to, support interaction between items and the standard application 15 while it is running.

Example Use Cases

An example is described with reference to FIGS. 5a-5d. A user at one location A desires that he/she is not interested in a type of commands (here commands of type Y) those commands will be hidden from the interface. When the user moves into a new location or different context (location B or C), the interface will update to the new context and adhere to the users preferences and hide the selected types (type Y) of commands even here. Other examples usages and example of how the method can be implemented is described in the description of the following sequence diagrams.

Figure 6A:
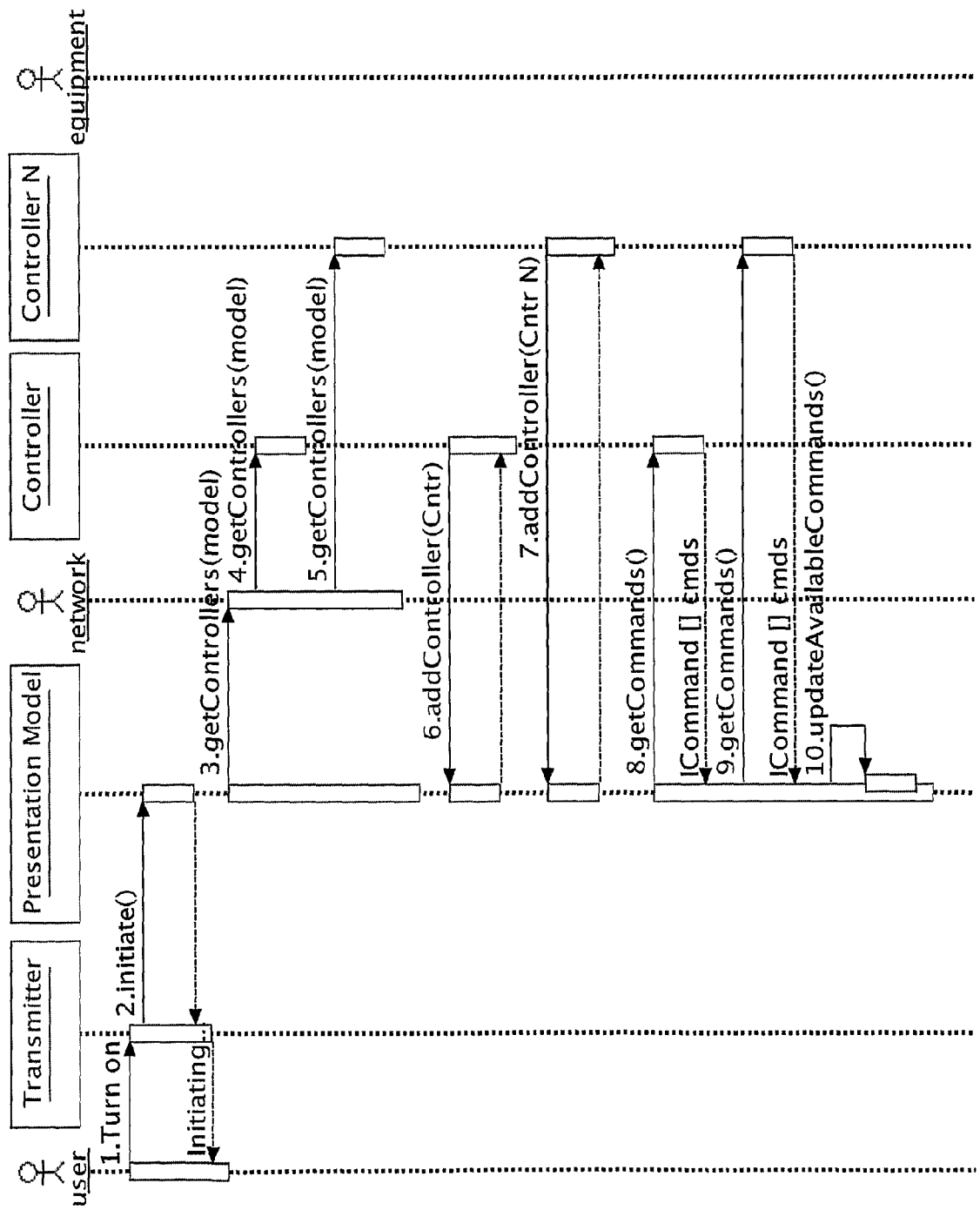
FIG. 6 shows how the disclosed method can be implemented, but not required to be, when a transmitter is initial turned on and a user sends an initial command.
Figure 6B:
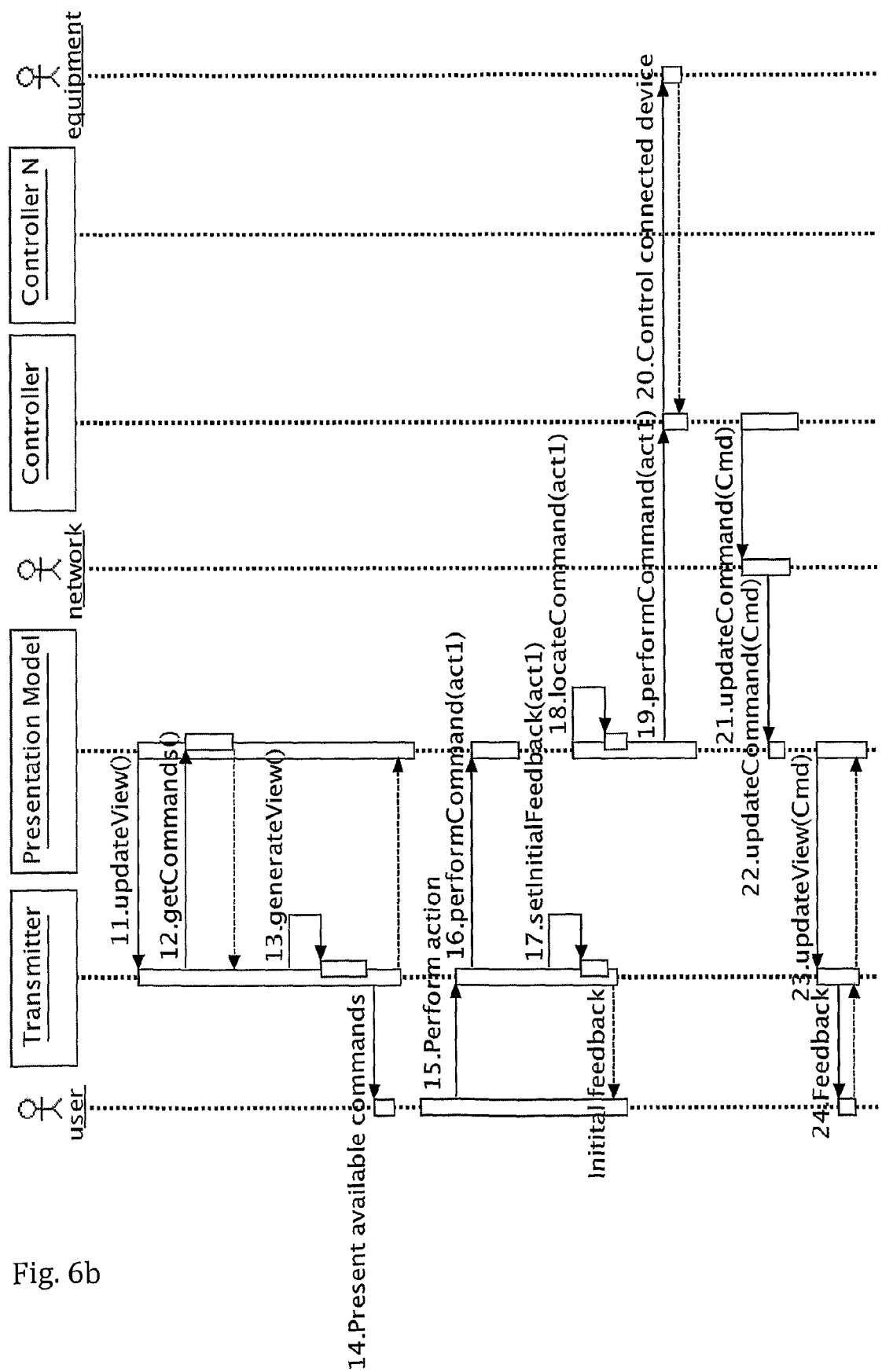

FIG. 6a-b shows an example use case when a device is initially turned on in a new environment and a user wants to control a specific device. The steps are briefly described in the following:

1. The user turns on the transmitter.
2. The transmitter asks the presentation model to initiate. The presentation model acknowledges the request.
3. The presentation model asks the network to tell all available controllers to contact it.
4. The network forwards the request to the controller.
5. The network forwards the request to all other known controllers as well.
6. The controller responds to the request from the network by directly contacting the presentation model with its contact details.
7. All controllers respond to the request from the network by directly contacting the presentation model with their contact details.
8. The presentation model asks the Controller for its commands. The controller responds with its list of commands.
9. The presentation model asks all available Controllers for their commands. Each of them responds with their personal set of commands.
10. When the presentation model has got commands from at least one controller it updates its internal list of available content. If there are many controllers available or if some of them are slow to respond this could be done multiple times.
11. As soon as the presentation model has updated the available content and that has resulted in a change it will inform the transmitter that there exist changes and it should probably update the presentation.
12. The transmitter asks the presentation model for the available content. The presentation model responds with its internal list of available content.
13. The transmitter uses the available content together with the known context to generate the interface for the user with the actions that the user is able to perform.
14. The transmitter presents the interface for the user.
15. The user performs one of the available actions.
16. The transmitter informs the presentation model of the action that the user just performed. The transmitter then give some initial feedback to the user if that is specified for the command.
17. The transmitter sets a temporary feedback while waiting for feedback from the controller.
18. The presentation model locates the command associated with the action to ensure that there is a valid action.
19. The presentation model contact the controller associated with the command and forwards the action request to that controller.
20. The controller interprets the action to perform the control of the attached devices. If the devices are able to give any feedback this is interpreted by the controller to update the status of the command if needed.

21. The controller checks if the action has changed the status of the command in any way. If the status of the command has changed an update is sent to the network so all transmitter can be updated with the new information.

22. The network contacts each active transmitter with the information about the updated command.

23. The presentation model verifies if the updated command changes the representation of available content. If the representation has changed the changes are sent to the transmitter so it can update the presentation for the user.

24. The transmitter updates the representation and shows the current status to the user.

Figure 7:
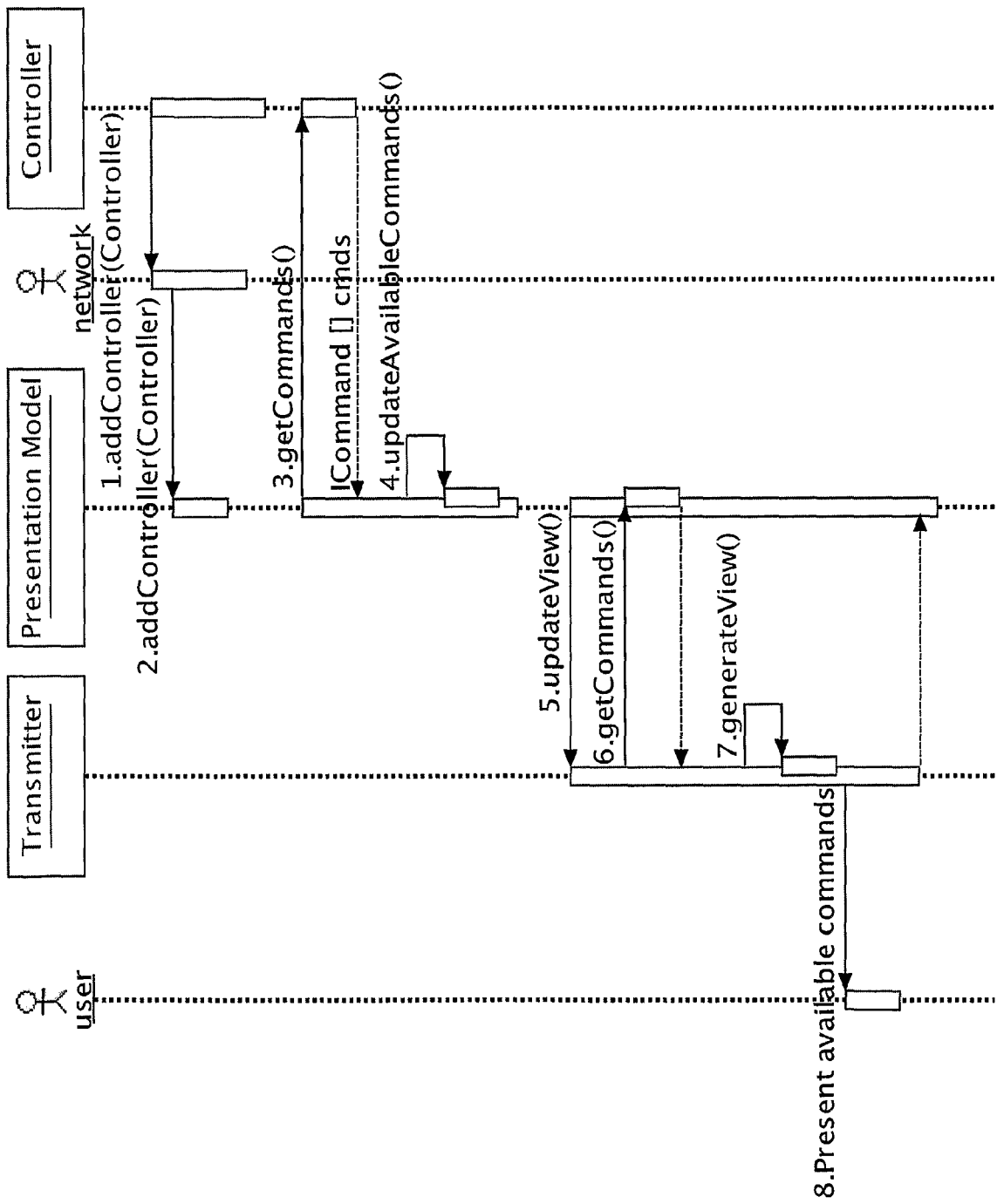
FIG. 7 shows how the disclosed method can be implemented, but not required to be, when a new controller becomes available.

FIG. 7 shows an example use case when a new controller becomes available. The steps are briefly described in the following:

1. The new controller informs the network that it is available.
2. The network contacts each active listener with the information about the new controller.
3. The presentation model asks the controller for its commands. The controller responds with its list of commands.
4. When the presentation model has got new commands it updates its internal list of available content.
5. As soon as the presentation model has updated the available content and that has resulted in a change it will inform the transmitter that the there exists changes and it should probably update the view.
6. The transmitter asks the presentation model for the available commands. The presentation model responds with its internal list of available content.
7. The presentation model uses the available content to generate the interface for the user with the actions that the user is able to perform.
8. The transmitter presents the interface for the user.

Figure 8:
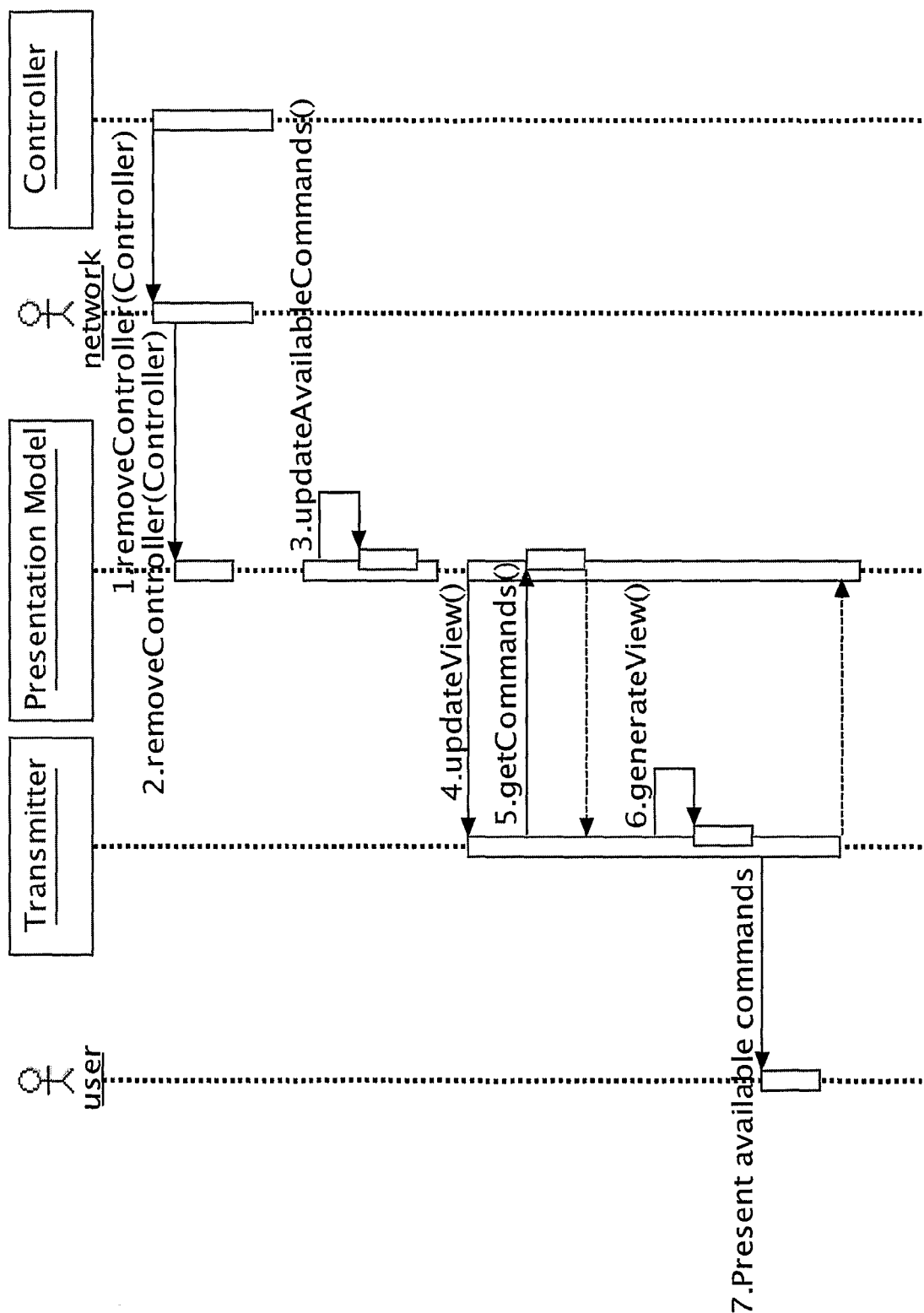
FIG. 8 shows how the disclosed method can be implemented, but not required to be, when a controller becomes unavailable.

FIG. 8 shows an example use case when a controller becomes unavailable. The steps are briefly described in the following:

1. The network is informed that the controller is unavailable.
2. The network informs each active listener that the controller has become unavailable.
3. The presentation model removes any commands from the controller and updates its internal list of available content.
4. If the update of available content has resulted in a change the presentation model will inform the transmitter that there exist changes and it should probably update the presentation.
5. The transmitter asks the presentation model for the available content. The presentation model responds with its internal list of available content.
6. The transmitter uses the available content to generate the interface for the user with the actions that the user is able to perform.
7. The transmitter presents the interface for the user.

Figure 9:
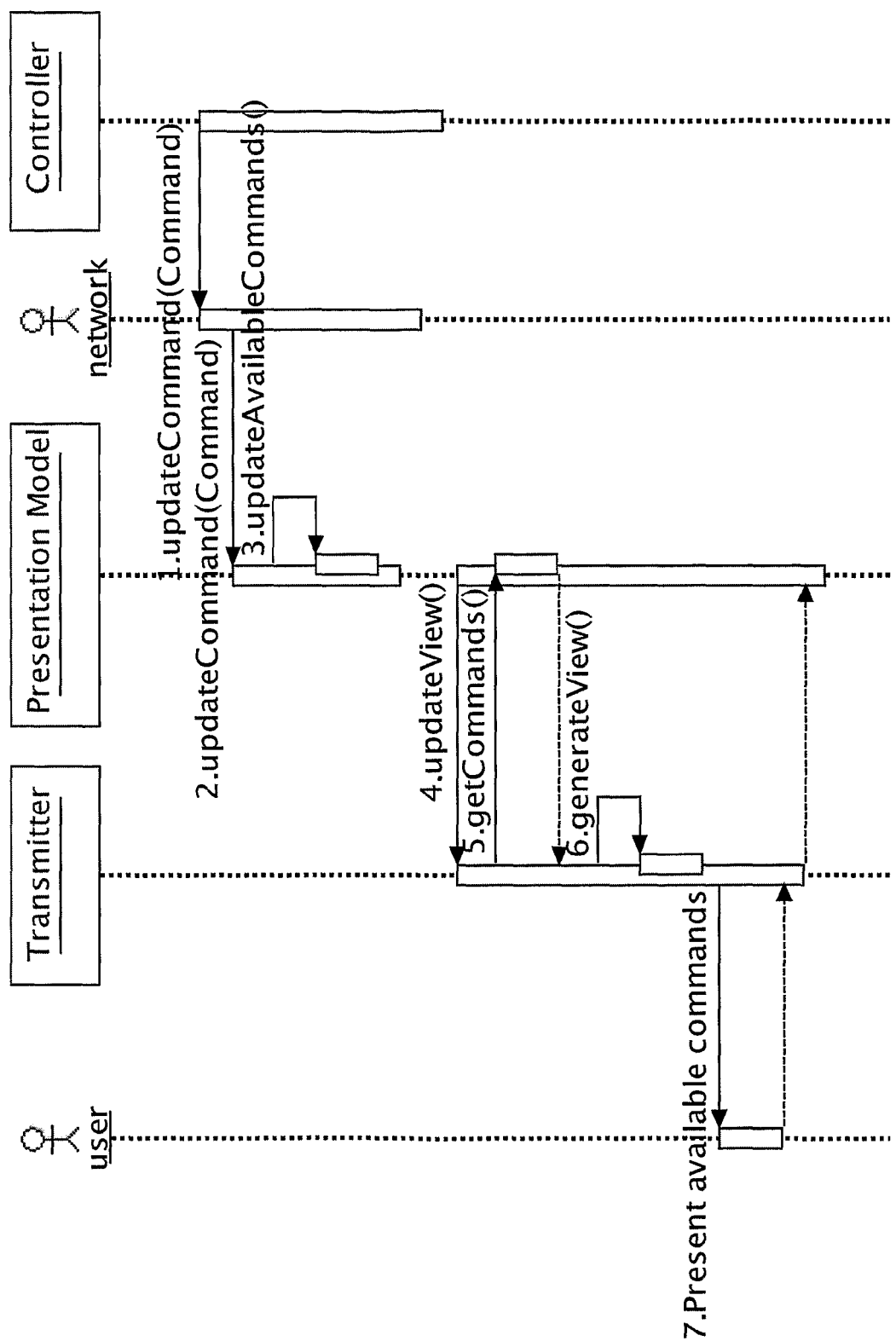
FIG. 9 shows how the disclosed method can be implemented, but not required to be, when a new command or updated command becomes available.

FIG. 9 shows an example use case when a new command becomes available or a command updates. The steps are briefly described in the following:

1. A controller informs the network that it has a new or updated command.
2. The network contacts each active listener with the information about the new or updated command.
3. When the presentation model has got the new commands it updates its internal list of available content.
4. As soon as the presentation model has updated the available content and the available content has changed it will inform the transmitter that the there exist changes and it should probably update the presentation.
5. The transmitter asks the presentation model for the available content. The presentation model responds with its internal list of available content.
6. The transmitter uses the available commands to generate the interface for the user with the actions that the user is able to perform.
7. The transmitter presents the interface for the user.

Figure 10:
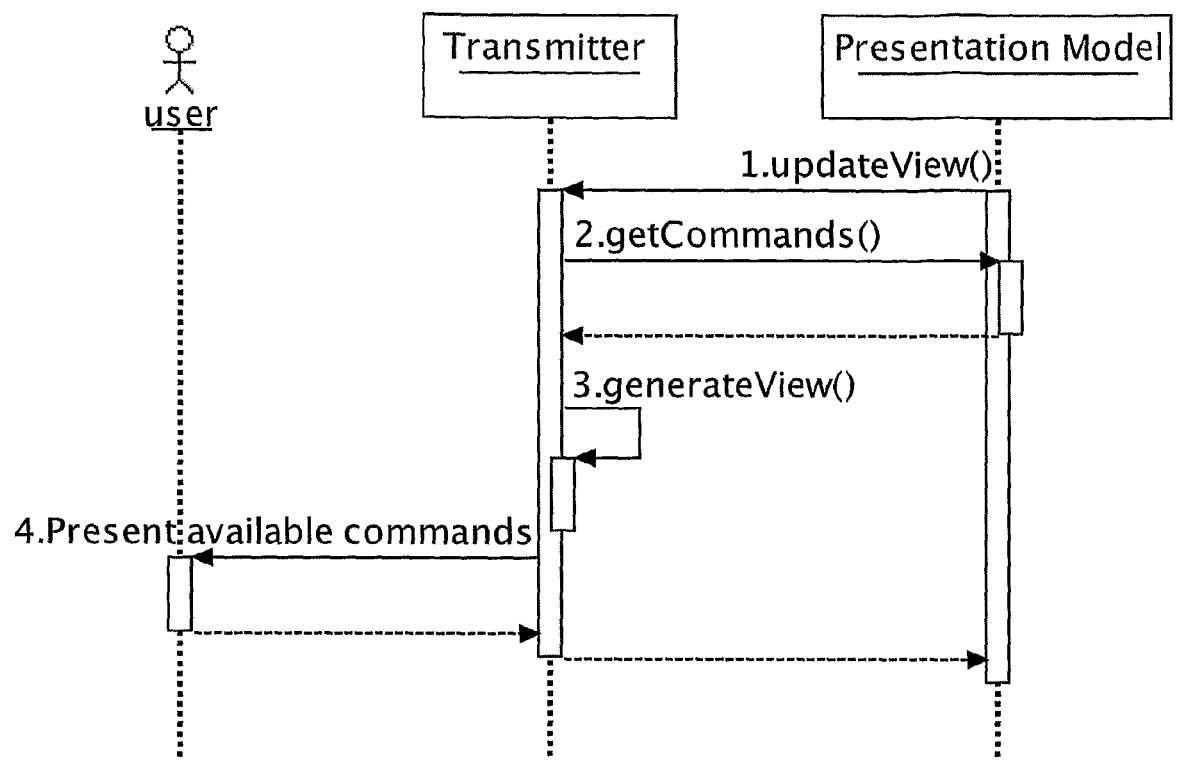
FIG. 10 shows how the disclosed method can be implemented, but not required to be, when for example the surrounding context changes.

FIG. 10 shows an example use case when the context has changed in the transmitter so a change of the available content is triggered. The steps are briefly described in the following:

1. When the presentation model has detected a change in the context that has resulted in that the available content has changed it will inform the transmitter that the there exist changes and it should probably update the view.
2. The transmitter asks the presentation model for the available content. The presentation model responds with its internal list of available content.
3. The transmitter uses the available content to generate the interface for the user with the actions that the user is able to perform.
4. The transmitter presents the interface for the user.

Example Interface

Figure 11:
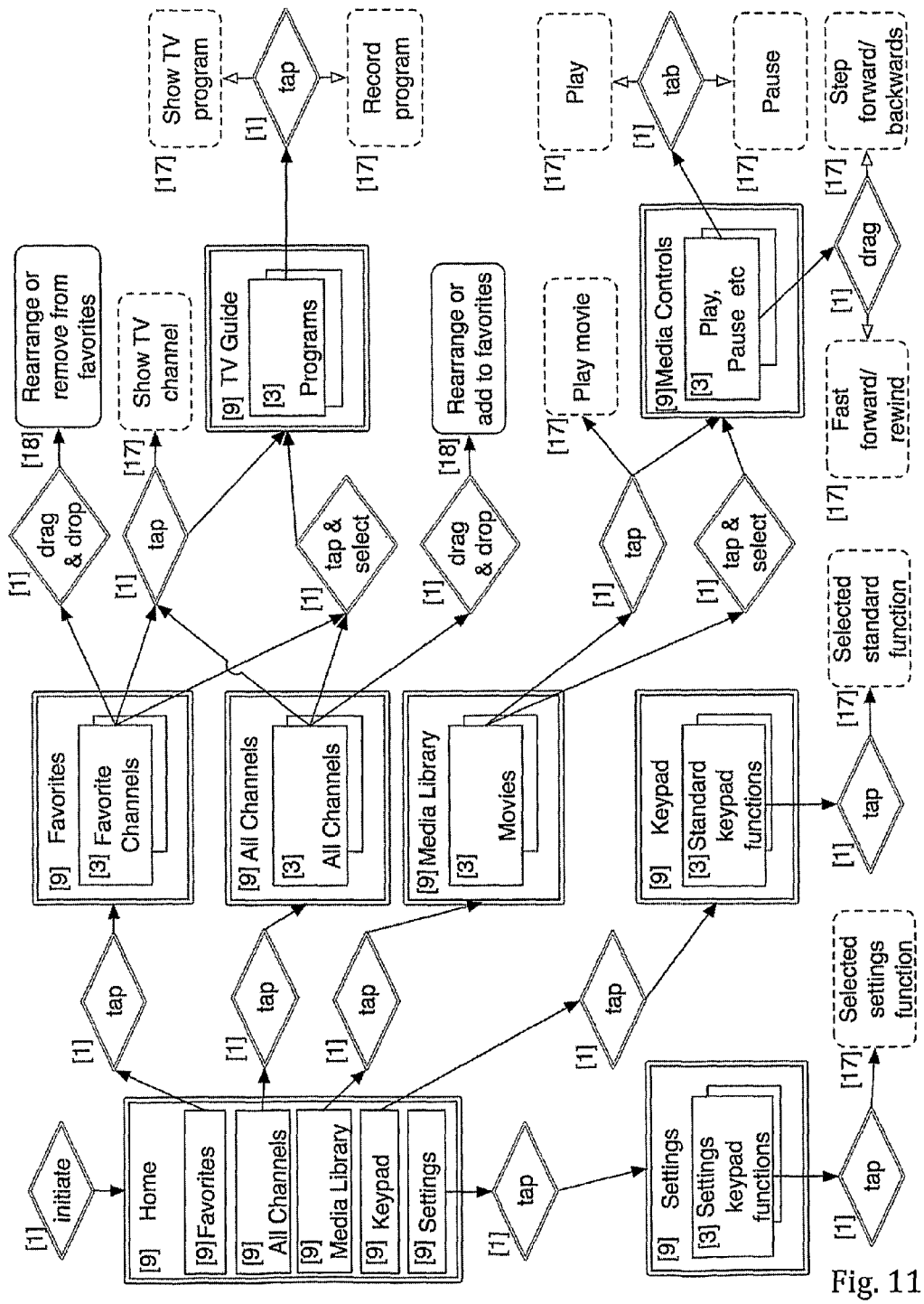
FIG. 11 example of how a transmitter can be configured to function as a smart TV controller.

FIG. 11 shows an input diagram of an example of how a transmitter can be configured to function as a smart TV controller. The diagram shows how presentation groups 9 can be used to create a hierarchy for a user interface, when a standard presentation group (see FIG. 3a-d) is selected (e.g. by pressing a designated area on a display) it's content can as in this example, but is not required to, be shown. In the diagram the activators 1 are located after the item that they are activating, the result associated with that activation of the item is shown after the activator 1. The diagram shows how multiple activators can be used to use an item in different ways. In this example the actual command 17 that the transmitter sends to control the TV is located at the end of each line.

The alternatives in the home group of the example are indented as follows. "Favorites" allows the user to save his or hers favorite TV channels for easy and fast access. "All channels" show any available channel and ensure that the user can access all of his or her channels. "Media library" gives the user a simple way to access movies and recorded TV shows. "Keypad" should let the user find the most used functions from ordinary TV remote controls if needed. "Settings" allow the user to separate special functions while maintaining a consistent interface for any settings relative to the TV.

The diagram also shows how configuration tasks 18 can be made a natural part of the interface, in the example the user configuration is limited to handling the favorites but it could include as much or as little as desired.

Scope

The disclosed method can be used both to enhance existing interfaces as well as enabling development of new interfaces and devices. The method could be used in, but not limited to, a wide range of usages from enhanced switches to device control and computer interfaces. What is new with this innovation is how the interface can be created dynamically and adhere to user preferences even when the available content and surrounding context has not been known previously.

The invention relates to a method to dynamically identify and combine available functions so that the same function will be presented in the same or similar way even when the context changes.

The invention further relates to a method to dynamically create a user interface which the user will operate in a consistent way regardless of which functions that are available.

The invention further relates to a method to dynamically adapt a user interface to the available context while maintaining a consistent representation for the user even if the device or user has not previously known the context.

The invention further relates to a method of combining visual components so they can be combined and used together in a standardized way.

The invention further relates to a system that can be modified and reconfigured without requiring that the configuration is compiled or uploaded from a third party component.

The invention further relates to a system that will inform available user interfaces of its available functions in such a way that they can be represented in a dynamic way in accordance with the user's preferences.

The invention claimed is:

1. A method performed in a mobile transmitter operable to provide multiple functions for remote control of a controllable electronic equipment, said method comprising:
   identifying available functions, wherein each function is provided for controlling a functionality to be performed by the controllable electronic equipment,
   receiving input relating to a current user context, wherein said user context includes a physical location of said mobile transmitter, wherein the physical location is determined by the mobile transmitter,
   based on said context, selecting a subset of functions from said available functions, and dynamically generating said user interface, said user interface arranged to present user activatable items for the controllable electronic equipment to be controlled, representing each of the functions in said subset, and
   upon activation of one of said items, performing a function associated with said item in accordance with said user context, thereby controlling the corresponding functionality of the controllable electronic equipment,
   wherein said user interface is automatically adapted when the mobile transmitter determines a change in the physical location of the mobile transmitter.

2. The method according to claim 1, wherein said subset is further limited based on user preferences received by the transmitter.

3. The method according to claim 1, wherein said user interface can be operated in a consistent way regardless of which functions that are available, the consistency of the user interface being dependent on a common presentation model for all available functions.

4. The method according to claim 1, wherein a result from an activated item is used to activate another item.

5. The method according to claim 1, wherein said user interface is arranged to present at least one selector, said transmitter being programmed to, upon activation of said selector, activate a plurality of items, associated with said selector, simultaneously or in sequence.

6. A system for enabling user interaction with controllable electronic equipment, comprising:
   a plurality of controllers, each connected to a piece of controllable electronic equipment and adapted to control said piece of controllable electronic equipment,
   a mobile transmitter, adapted to transmit commands to said controllers for remote control of the controllable electronic equipment,
   said transmitter being adapted to:
      identify available functions, wherein each function is provided for controlling a functionality to be performed by the controllable electronic equipment,
      receive input relating to a current user context, wherein said user context includes a physical location of said mobile transmitter, wherein the physical location is determined by the mobile transmitter,
      based on said user context, select a subset of functions from said available functions, and to dynamically generate said user interface, said user interface arranged to present user activatable items for the controllable electronic equipment to be controlled, representing each of the functions in said subset,
   wherein said transmitter is programmed to, upon activation of one of said items, perform a function associated with said item in accordance with said user context, thereby controlling the corresponding functionality of the controllable electronic equipment, and
   wherein said user interface is automatically adapted when the mobile transmitter determines a change in the physical location of the mobile transmitter.

7. The system according to claim 6, wherein the transmitter and the controllers are arranged to communicate by means of a network.

8. The method of claim 1, wherein said transmitter is adapted to transmit commands to a plurality of controllers, and said physical location of said transmitter is in relation to said plurality of controllers.

9. The system according to claim 6, wherein said physical location of said transmitter is in relation to said plurality of controllers.

* * * * *